April 9, 1968  C. B. GRADY, JR., ETAL  3,377,450
ELECTRIC PUSHBUTTON LEAF SPRING SWITCH
Filed April 22, 1966  2 Sheets-Sheet 1
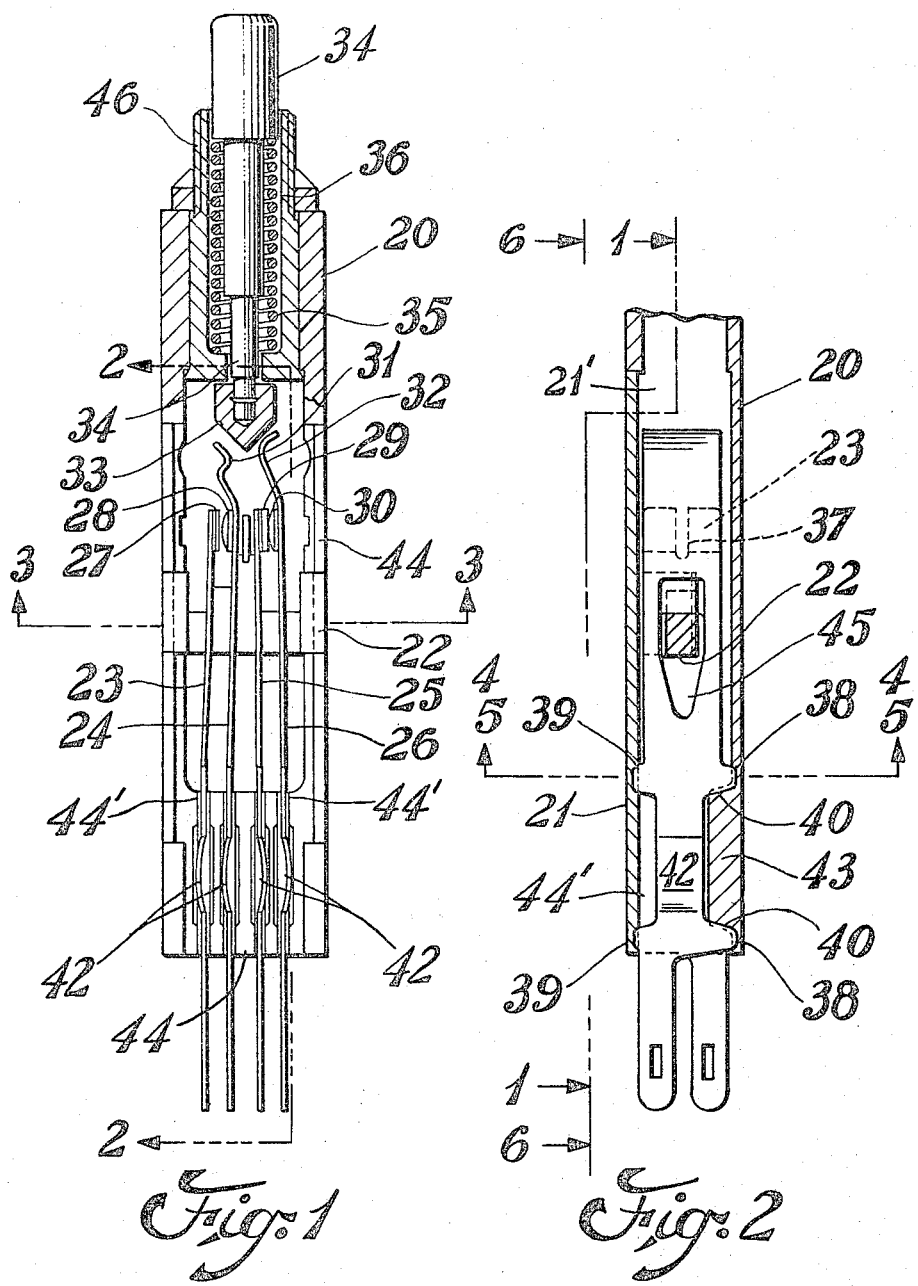
INVENTORS

[Patent No.] 3,377,450
[Patented] Apr. 9, 1968

3,377,450
ELECTRIC PUSHBUTTON LEAF SPRING SWITCH
Charles B. Grady, Jr., 1 Ridgeway Ave., West Orange, N.J. 07052, and Miguel G. Mendoza, 48 Park Lane, Fair Haven, N.J. 07701
Filed Apr. 22, 1966, Ser. No. 544,440
2 Claims. (Cl. 200—166)

ABSTRACT OF THE DISCLOSURE

Metal cantilever switch leaves having wedge shaped notches therein are assembled into a thermoplastic base having moulded nearly congruent cavities which are too shallow to fully embrace the width of the leaves. A thermoplastic cover is then dropped over the leaves and supersonic vibrations with static pressure is applied resulting in first melting the metal-plastic interfaces and subsequently, the plastic-plastic interfaces. The sonic energy is then discontinued but with continuing static pressure, thereby freezing the parts into accurate positional relation due to the use of the wedge shaped recesses in the body as its own assembly jig.

---

This invention relates to a novel design of electric push button leaf switches and the method which permits their fabrication by means of a sonic welding operation which thermally imbeds the metal switch blade leaves between a thermoplastic body and a thermoplastic cover in such a way that these leaves are accurately located and made immobile relative to the body regardless of dimensional tolerance differences between the constituent parts.

In the art of electric switch manufacture there is a recurring problem of inexpensively securing switching leaves to the body of the switch in such a way that the mechanical stresses which may be set up by soldering or wrapping wires to the terminal leaves will not be transmitted to the interior of the switch, whereby to displace the leaves, or mechanically interfere with the sequence or contact pressure of the switch. It is common practice to either individually rivet or stake each leaf in place, or to assemble them into a sandwich configuration which may be clamped together by screws or rivets. Another common technique is to cast the plastic around the leaves or switch parts as inserts. However, these methods of manufacture require multiple operations and handling, resulting in substantial manufacturing labor costs.

The present invention greatly reduces the manufacturing steps, requiring only the insertion of the leaves into locating cavities in the thermoplastic body, and the imbedment of the metal leaves and welding together of the thermoplastic body and cover by the application of an intense supersonic pressure vibrating in the frequency range of 15 to 30 kilocycles.

This invention teaches the design of the switch parts to be welded together so as to present wedge shaped mating male and female surfaces which are in dimensional interference so that the supersonic welding energy will produce frictional heat at these nesting points of contact whereby to melt the thermoplastic body and cover and allow the metal terminal leaves to imbed themselves therein to a controlled degree as determined by the seating of the thermoplastic cover in a shouldered recess in the body.

The elements of the invention are thus: first, a thermoplastic switch body having a plurality switch blade cavities open on at least one side, and having a cover recess shoulder effectively surrounding said cavity openings; second, a thermoplastic cover adapted to seat in the foregoing recess in the body member; and third, a plurality of metal switch blades adapted to seat in said body cavity with a wedge-shaped engagement therebetween, the dimensions of said switch blades being such that, when seated in said cavity, a mechanical interference exists preventing the seating of said cover in said recess until the application of vibratory pressure produces enough frictional heat to embed the metal leaves into the thermoplastic body and cover until the cover seats into the body recess and is welded thereto by continued application of the supersonic vibrational pressure.

The principal object of this invention is to provide a multiple leaf switch design which permits an inexpensive and positive assembly and securance of its constituent parts by a supersonic welding operation.

Another object of the invention is to provide a switch design in which the degree of embodiment of its metal parts into its thermoplastic parts by supersonic pressure is limited by a shouldered relation between the thermoplastic parts which transfers the vibratory energy away from the metal after a predetermined penetration.

Still another object of the invention is to provide a miniature push button leaf switch design in which the mechanical stresses set up by attaching wires to the exterior terminal portions of these leaves will not be transmitted to the interior working portions of these leaves to interfere with the proper operation of the switch.

For other objects and a clearer understanding of the invention, reference is made to the following detailed specification to be taken in conjunction with the accompanying drawings, in which:

FIGURE 1 is a sectional longitudinal view of the preferred embodiment of the subject switch;

FIGURE 2 is a sectional longitudinal view through 2—2 of FIGURE 1 taken at right angles thereto;

Figure 3:
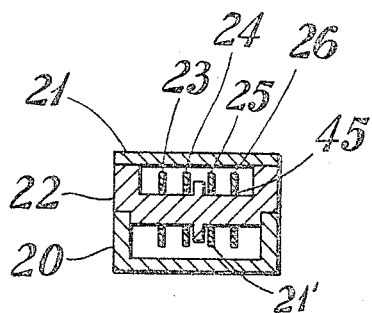
FIGURE 3 is a transverse view through plane 3—3 of FIGURE 1.

Referring to the drawings, numeral 20 refers to an elongated switch body made of a thermoplastic such as "Lexan" and provided with a plurality of switch blade slots or cavities 44' which are open on three sides. These openings permit the switch blades: (1) to emerge from the body to form terminals of the device, (2) to enter a switching cavity 21' inside the body, and (3) to be covered and retained by a thermoplastic cover plate 21.

Figure 6:
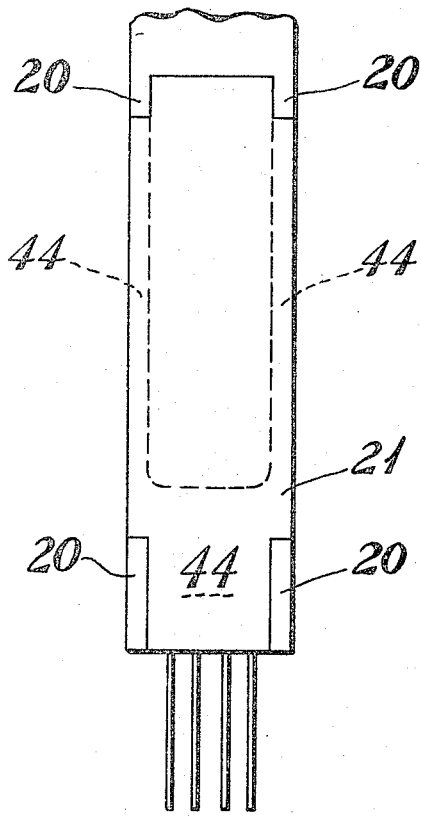
FIGURE 6 is an exterior view from plane 6—6 of FIGURE 2 showing how the cover is positioned by a cover recess in the body.

In FIGURE 6 it may be seen that cover 21 has a cruciform shape which is congruent with the shoulder surface 44, which is recessed into the body 20, and which effectively surrounds or embraces the foregoing openings of cavities 44.

In this preferred embodiment, four resilient metal switch leaves 23, 24, 25, and 26 are provided, each of which has a crossbar type of cylindrically contoured precious metal contact 27, 28, 29, or 30, respectively secured to its switching end.

A thermoplastic insulating bridge member 22 passes through an aperture 45 in each of said switch blades, and seats in a mating retaining cavity in body 20.

The contour of bridge 22 together with the heights of apertures 45 determine the position of the switch leaves in this unactuated position. Thus leaves 23 and 24 comprise a normally open pair of contacts, while leaves 25 and 26 comprise a normally closed pair of contacts.

A threaded metal bushing 36 is pressed into body 20, and contains a stemmed push buton 34 and bias spring 35. A plastic insulating conical actuating cam 33 is pressed on to the stem end of push button 34, and acts as a retainer therefor.

Depression of button 34 causes cam actuator 33 first to encounter a cam surface 32 of leaf 26 thereby opening the normally closed contact leaves 25–26, and second, to encounter a cam surface 31 of leaf 24, thereby closing the normally open contact leaves 23–24.

The arcuate portions 42 of the four spring contact leaves serve to press the leaves against one wall of cavities 44 for accurate alignment in a parallel configuration during the manufacturing operation of supersonic pressure assembly.

Leaves 23 through 26 are each provided with two pairs of protrusions 38 and 39, one pair on each side. The protrusions 38 of each leaf have inclined sides 40 which form a female wedge shaped engagement with the trapezoidal male protrusion formed in the thermoplastic base member 20. This wedge shaped engagement between leaves 23 to 26 and base 20 insures the accurate longitudinal alignment of the crossbar contacts 27, 28, 29, and 30.

Figure 4:
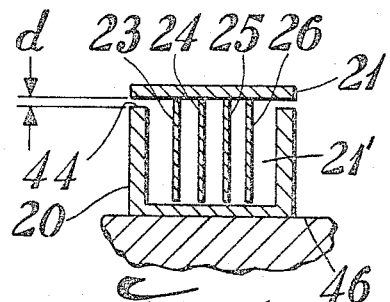
FIGURE 4 is a transverse view through 4—4 of FIGURE 2 showing the metal switch leaves and thermoplastic cover assembled together before supersonic welding.

During the assembly of the switch, and before the supersonic embodiment and bonding process, the dimensions of the leaf protrusions and base recesses 44 and wedge members 38 and 39 are such that a section through plane 4—4 of FIGURE 2 appears as shown in FIGURE 4. That is, a mechanical interference exists which prevents the seating of the cover 21 by a distance equal to $d$ as shown in FIGURE 4.

Figure 5:
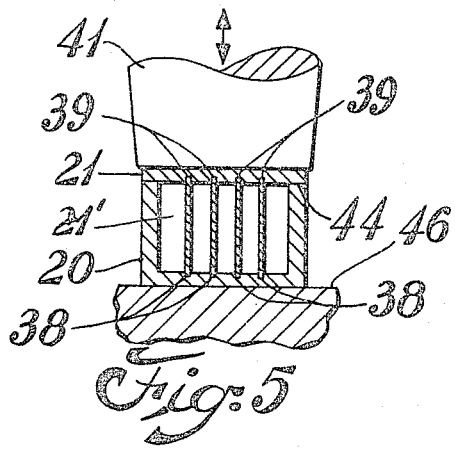
FIGURE 5 is a view at the same plane of FIGURE 4 shown at the completion of the supersonic assembly pressure imbedment and thermoplastic welding operation.

As taught by this invention, when a vibratory pressure is brought to bear as shown in FIGURE 5 by a supersonic transducer horn 41, thereby clamping the switch assembly between horn 41 and an immobile anvil 46, frictional heat is at first generated between the metal protuberances 39 and the thermoplastic cover 21, and, simultaneously between metal protuberances 38 and the thermoplastic case trapezoid 43, so that the harder metal sinks into the softer thermoplastic material for a predetermined displacement which is determined by the instant at which the cover 21 contacts and seats on the shoulder 44 of cover 20. At this instant, the vibratory energy dissipated at the metal switch blades greatly diminishes and this energy dissipation is transferred to the newly generated area of contact between the cover 21 and the base shoulder 44. Continued pressure between the vibrating horn 41 and anvil 46 then heats this interface and forms a welded bond which solidifies on de-energization of the supersonic excitation of horn 41, thereby securing cover 21 to case 20.

A last essential step in this method of fabrication is that the physical static pressure between case and cover be continued long enough after de-energizing the vibration for the plastic to freeze, thereby completing the weld.

The degree of intrusion of the meal leaves into the thermoplastic parts may be seen in the cross section of FIGURE 5 which represents the final state of switch fabrication. Due to this thermal embodiment, which accommodates any dimensionad differences between the switch leaves, any stresses applied to the exterior terminal portion of the leaves by wire attachment will be isolated from influence on the interior performance of the switch by transferring these stresses to the case 20.

The vibratory transducer and impedance matching horn 41 may be of any type familiar to the art, such as magnetostrictive or piezoelectric. The recommended economic frequency range is between 15 and 30 kilocycles per second.

What is claimed is:

1. An electrical leaf switch comprising a thermoplastic body having a switching cavity, a plurality of switch-cavity-openings therein, opening into at least one side of the switch cavity, and a shoulder surface above the body cavity and the cavity openings, a thermoplastic cover adapted to seat on said shoulder surface, a plurality of metal switch leaves seated in said cavity-openings, and extending into the switching cavity, said leaves having opposed lateral wedge shaped protuberances aligned with the cavity openings, the dimensions of said switch leaves including the protuberance being wider than the depth of the body cavity when said leaves are preassembled in said cavity openings so that a mechanical interference exists preventing the full seating of said cover on said shoulder surface until the application of vibratory pressure to said preassembly generates enough frictional heat to melt the thermoplastic body and cover whereby said leaves are embedded in said body and cover to a predetermined degree, said switch leaves thereby being bonded into said body and covers and said cover thereby being bonded to the body.

2. An electrical leaf switch as defined in claim 1, and said leaves having aligned intermediate apertures, a thermoplastic bridge seated in said body switching cavity and extending through the apertures in the leaves and extending even with the level of the shoulder surface of the body and being molded therewith.

References Cited

UNITED STATES PATENTS

| | | | |
|---|---|---|---|
| 2,348,088 | 5/1944 | Nichols et al. | 200—166 |
| 3,022,814 | 2/1962 | Bodine | 156—73 |
| 3,242,029 | 3/1966 | Deans | 156—380 |

ROBERT K. SCHAEFER, *Primary Examiner.*

H. O. JONES, *Assistant Examiner.*